United States Patent [19]

Monacelli

[11] 4,040,325

[45] Aug. 9, 1977

[54] TACK-STRIP AS OBTAINED BY HEAD-CEMENTING

[76] Inventor: Umberto Monacelli, Via Parini 6, Monza (Milan), Italy

[21] Appl. No.: 700,108

[22] Filed: June 28, 1976

[30] Foreign Application Priority Data

June 26, 1975  Italy .................................. 24811/75

[51] Int. Cl.² ............................................ F16B 15/08
[52] U.S. Cl. ........................................ 85/17; 206/343
[58] Field of Search ............... 85/17, 10 R, 16, 18; 206/343, 344, 346, 345; 156/559, 560, 583, 320

[56] References Cited

U.S. PATENT DOCUMENTS

| 2,294,463 | 9/1942 | Krantz | 85/17 X |
| 2,564,802 | 8/1951 | Coleman et al. | 85/17 X |
| 3,276,576 | 10/1966 | Langas et al. | 206/345 X |
| 3,645,164 | 2/1972 | Wurth | 85/17 |

FOREIGN PATENT DOCUMENTS

| 1,957,930 | 6/1971 | Germany | 85/17 |

Primary Examiner—Ramon S. Britts

[57] ABSTRACT

A tack package to be loaded in a tack-spitting machine magazine is disclosed, in which the individual tacks are arranged in line and consecutive tack heads are cemented to each other by a hot melt adhesive applied in drops; when using a glue-gun or similar tool, it is an advantage not to discontinue the cement feed so as to have consecutive adhesive drops connected by a slender adhesive seam.

4 Claims, 5 Drawing Figures

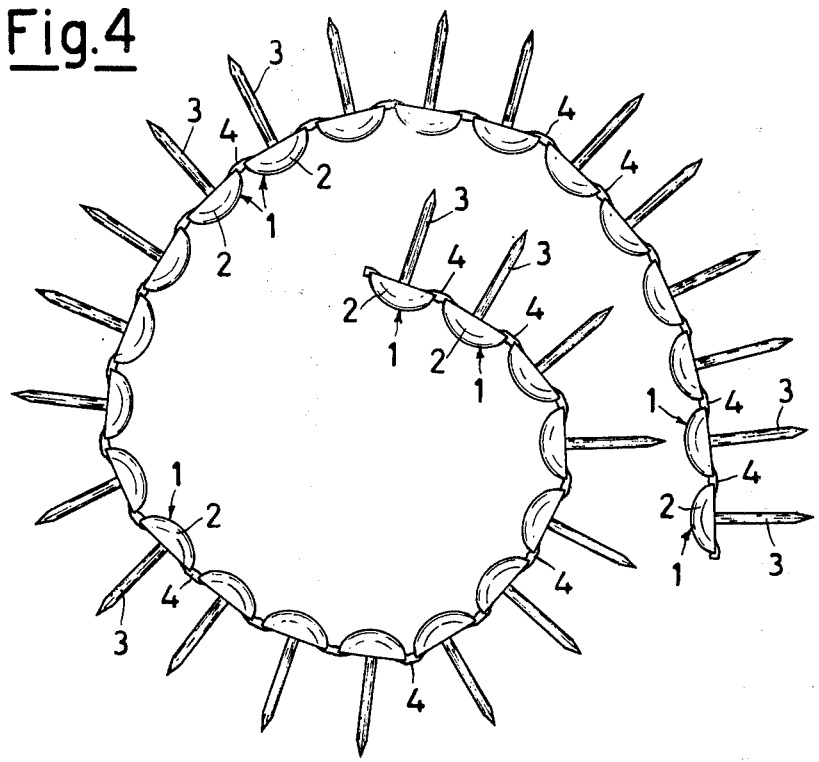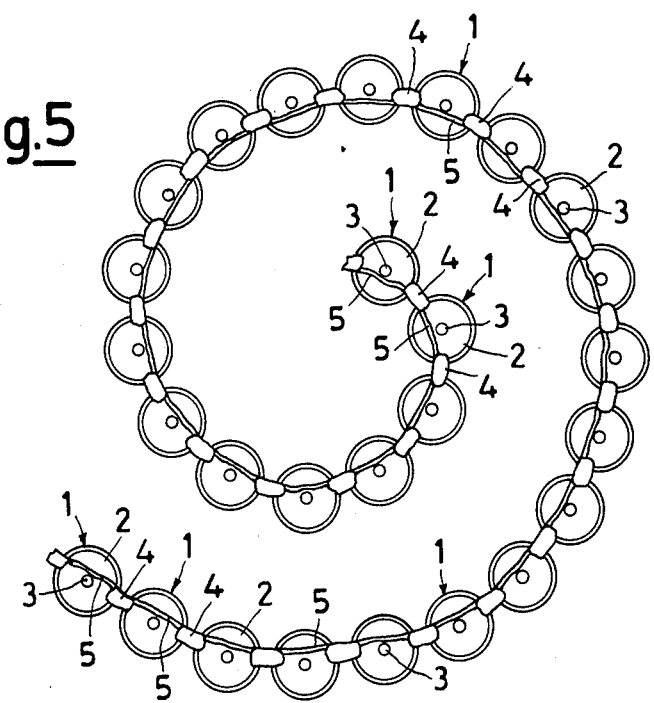

TACK-STRIP AS OBTAINED BY HEAD-CEMENTING

This invention relates to a tack-strip composed by wide-head tacks, in which the mutual connection between the several serially arranged tacks is achieved in correspondence with the heads, rather than in correspondence with shanks or the stalks according to the usual practice.

More detailedly, the tack-strip according to this invention is characterized in that said mutual connection is obtained by cementing the tack heads with drops of an adhesive which can be melted by heat (more particularly the so-called "hot melt"), said drops being positioned between consecutive tack heads.

A strip prepared in this way affords the outstanding advantage of enabling the tacks to be packaged in a number of coiled arrangements such as in the form of converging-stalk spirals, diverging-stalk spirals, parallel-stalk spirals and in a cylindrical helix arrangement as well.

Said possibilities are not all available to the conventional packages wherein the connection is made in correspondence with the stalk, whereas they afford, on the other hand, the advantage of permitting that packages made according to the invention can be used with feeding magazines of various kinds and shapes.

By way of example, a tack-package according to the invention is shown in the accompanying drawings, wherein:

FIGS. 3, 4 and 5 are side-elevational views, or bottom plan views of several embodiments of coiled tack-packages.

Figure 1:
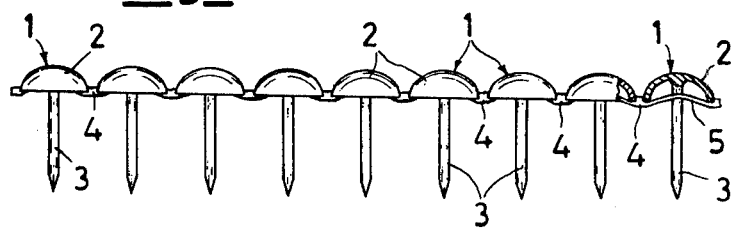
FIG. 1 is a side elevational view, partly in cross-section, of a tack package in an in-line arrangement.
Figure 2:
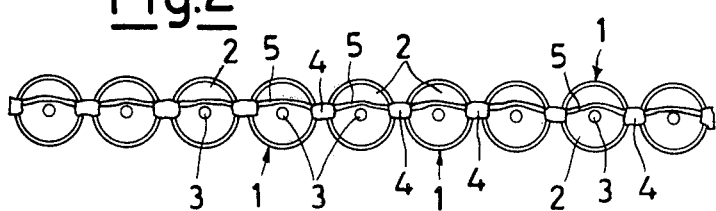
FIG. 2 shows the same tack-package in bottom plan view.

The tack-package as shown in FIGS. 1 and 2 comprises a sequential array of tacks 1, which are composed by a wide rounded head 2 and a stumpy shank or stalk 3.

The several tacks are connected to one another in a separable manner (so as to provide a self-contained tack package in which the tacks are spaced apart from one another, to be ejected by an appropriate tack-driving tool) by cementing consecutive heads with drops of a hot melt adhesive 4 placed between each head and its next ones.

As can be seen in FIG. 2, the adhesive drop 4 are actually connected to one another continuously by filaments 5 of the same adhesive. These filaments, however, are not intended for fastening the tacks, but are nothing but the result, which could even be preferred, of the use of a continuous-type glue-gun for the formation and application of the several drops 4. These filaments could be tangent to the tack stalks and even slightly winding, just as shown in FIG. 2.

Figure 3:
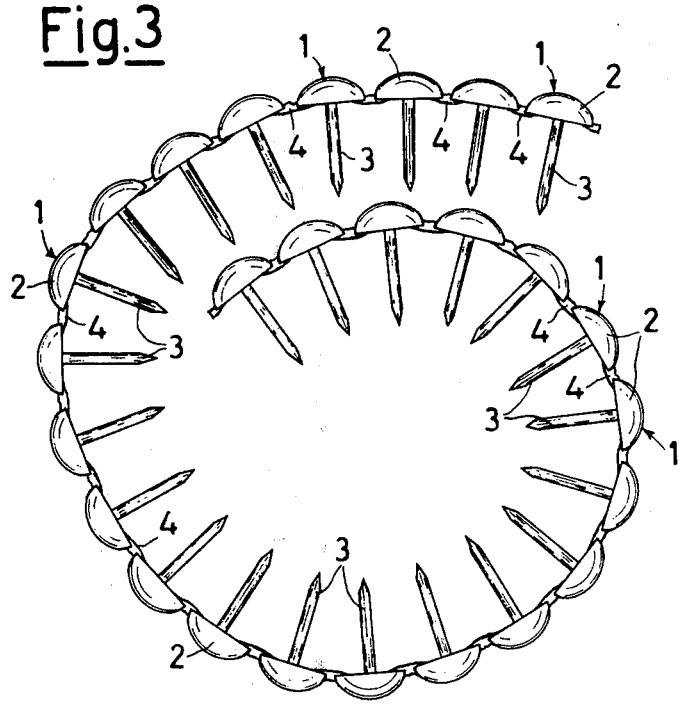

In addition to the in-line array of FIGS. 1 and 2, the tack-package as shown therein could also be presented in a coiled condition, that is, converging-stalk coil (FIG. 3), diverging-stalk coil (FIG. 4), parallel-stalk coil (FIG. 5) and also in a cylindrical-helix arrangement.

The selection is a function of the kind and the shape of the magazine for which the tack-package is intended. The advantage is just that of affording a free choice among the above-enumerated arrangements. Another advantage is that of having facilitated to a degree the break of the bond between consecutive tacks at the instant of the ejection of the individual tacks.

What I claim is:

1. A flexible tack package comprising a consecutive array of tacks, each having a round head and an integral shank substantially smaller in diameter than the associated head, and means separably connecting only the heads of adjacent tacks to each other, characterized in that said connecting means comprises drops of a hot melt adhesive positioned between consecutive tack heads.

2. A tack package according to claim 1, characterized in that said adhesive which can be melted by heat is a hot melt adhesive.

3. A tack package according to claim 1, characterized in that said drops of hot melt adhesive are connected to each other in a continuous manner by filaments of the same adhesive.

4. A tack package according to claim 3, characterized in that said filaments are substantially tangent to the tack shanks adjacent the junctures thereof with the associated tack heads.

* * * * *